United States Patent [19]

Tannenbaum et al.

[11] Patent Number: 5,526,471
[45] Date of Patent: Jun. 11, 1996

[54] RENDERING OF NON-OPAQUE MEDIA USING THE P-BUFFER TO ACCOUNT FOR POLARIZATION PARAMETERS

[75] Inventors: David C. Tannenbaum, Hurley; Andrew D. Bowen, Saugerties, both of N.Y.

[73] Assignee: International Business Machines Corporation, Armonk, N.Y.

[21] Appl. No.: 168,109

[22] Filed: Dec. 15, 1993

[51] Int. Cl.⁶ .................................................. G06T 15/50
[52] U.S. Cl. ............................................ 395/119; 395/132
[58] Field of Search ..................................... 395/119, 132; 364/729; 356/351; 430/51

[56] References Cited

U.S. PATENT DOCUMENTS

| | | | |
|---|---|---|---|
| 3,813,528 | 5/1974 | Blanding | 364/729 |
| 4,603,398 | 7/1986 | Bocker et al. | 364/845 |
| 4,813,761 | 3/1989 | Davis et al. | 359/40 |
| 5,001,470 | 3/1991 | Bandai | 395/122 |
| 5,253,335 | 10/1993 | Mochizuki et al. | 395/122 |

OTHER PUBLICATIONS

Foley et al, Computer Graphics; Principles & Practice, 1990, p. 754–759.
Born et al, Principles of Optics, 1975, pp. 544–555.
Wolff et al, Ray Tracing with Polarization Parameters, Computer Graphics & Applications, vol. 10 No. 6, Nov. 1990, pp. 44–55.
Molnar et al., PixelFlow: High Speed Rendering Using Image Composition, Computer Graphics, Jul. 1992, pp. 231–240.
Boerner, The Concept of the Polarmietric Matched Signal and Image Filters, Antennas and Propagation, 1991, pp. 249–252.

*Primary Examiner*—Heather R. Herndon
*Assistant Examiner*—Anton W. Fetting
*Attorney, Agent, or Firm*—Mark S. Walker

[57] ABSTRACT

A system and method for determining and applying the effect of light polarization on the rendering of graphics objects. A polarization state buffer is provided to maintain polarization state on a pixel by pixel basis for each pixel in a frame buffer. As graphics objects are rendered the polarization state information is updated based on the underlying opaque surface, the polarization state of the light, and the characteristics of non-opaque objects being drawn. Pixel intensity is adjusted based on the degree of polarization, and the angle of the polarization axis. An approximation of the pixel intensity function is implemented using standard hardware logic.

6 Claims, 7 Drawing Sheets

| Degree of Polarization | | | Angle of Polarization | | | | |
|---|---|---|---|---|---|---|---|
| P2 | P1 | P0 | A4 | A3 | A2 | A1 | A0 |

RENDERING OF NON-OPAQUE MEDIA USING THE P-BUFFER TO ACCOUNT FOR POLARIZATION PARAMETERS

BACKGROUND OF THE INVENTION

1. Field of the Invention

The present invention relates in general to graphics processing systems and, more particularly, to graphics systems consisting of rasterization hardware used to produce three-dimensional graphical representations of data. Still more particularly the present invention relates to a system in which transparent materials are supported and rendered and, even more particularly, where polarization states are accounted for when producing the graphical representations of transparent objects.

2. Background and Related Art

Computer graphics systems are widely used in a variety of applications in which there is a need to visualize non-opaque media. For example, when designing a car it is advantageous to be able to include the geometric description of the windshield in the model without the windshield obscuring the view of the car's cabin. In a graphics system a partially transparent object is used to represent the window. In general the light transmitted through a transparent object is a function of the coherency state of the incident light.

The light associated with specular reflections has a high degree of polarization. In current computer graphics systems, no account is taken of the polarization state that exists in either the light incident on a surface or the polarization state of the light that ultimately reaches the viewer. For example, in a physically realistic model, if a specular reflection is seen through a non-opaque object of some sort (possibly a filter) the intensity of the specular highlight relates strongly to the polarizing properties of the intervening medium, and the relative orientations of the surface and intervening medium.

The current invention is directed towards providing a means by which the intensity of a specular reflection can be more accurately tempered to better represent the effects of polarization on the specularly reflected light.

It will be understood that within the context of this application the terms non-opaque and transparent are used interchangeably.

SUMMARY OF THE INVENTION

The present invention provides a system and method for adjusting a graphics image to account for light polarization. The present invention stores polarization status information for each pixel and applies that information to pixel intensity for each pixel of a non-opaque object. The present invention provides a computer system for generating a two dimensional representation of three dimensional data in response to graphics orders, the graphics orders including object attributes, the computer system including processor means for processing instructions, the system comprising: first memory means for storing pixel data indicating an intensity value for each of a plurality of pixels, the pixel data being generated by the processor means in response to the graphics order; second memory means for storing a polarization value for each of the plurality of pixels; and processor means for modifying the intensity value and the polarization value in response to a second graphics order.

It is therefore an object of this invention to provide a method and apparatus in which transparent objects can be displayed.

It is another object of this invention to provide a method and apparatus in which the intensity transmitted through transparent objects is modulated in response to polarization state information.

It is yet another object of this invention that multiple transparent materials be rendered such that their ultimate coherency and polarization states are correctly accumulated.

The foregoing and other objects, features and advantages of the invention will be apparent from the following more particular description of a preferred embodiment of the invention, as illustrated in the accompanying drawings wherein like reference numbers represent like parts of the invention.

DESCRIPTION OF THE PREFERRED EMBODIMENT

Figure 1:
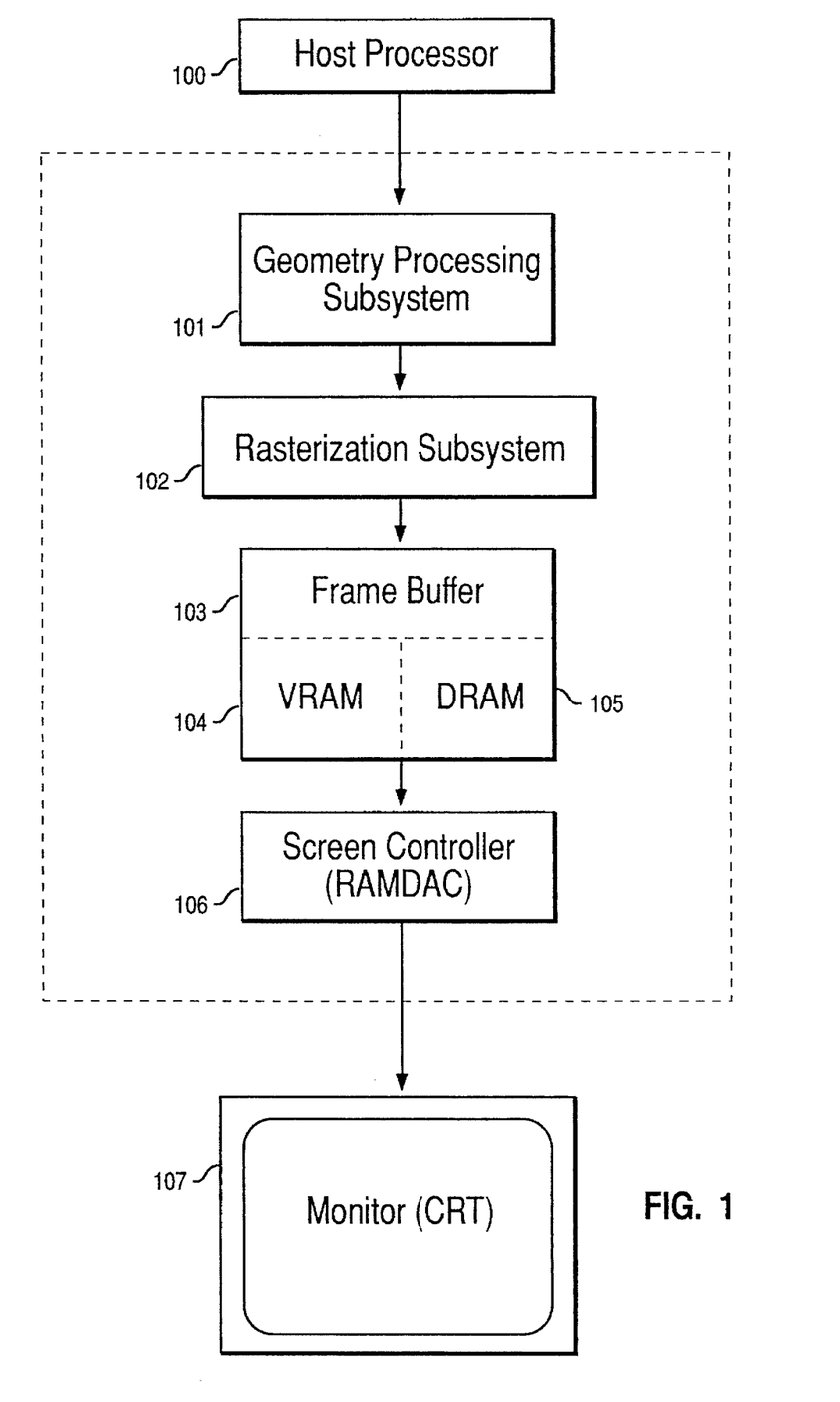
FIG. 1 depicts the general architecture of a graphics adapter system.

Consider the graphics system depicted in FIG. 1. The system consists of host processor 100 which sends graphics orders to geometry processing subsystem 101. The geometry processor 101 can also be contained as part of the function performed by host processor 100 and need not be a physically or logically separate entity. In the preferred embodiment rasterization subsystem 102 receives a stream of primitives.

Upon processing of the data stream, rasterization subsystem 102 produces a plurality of pixels which are then sent to frame buffer 103, the displayable portion of a pixel is typically directed to video random access memory (VRAM) 104 and the non-displayable portion destined for Z-buffers, stencil buffers, etc., to dynamic random access memory (DRAM) 105. RAMDAC 106 receives serially scanned data from VRAM 104 and converts the digital data into the analog control signals used by CRT monitor 107.

Figure 2:
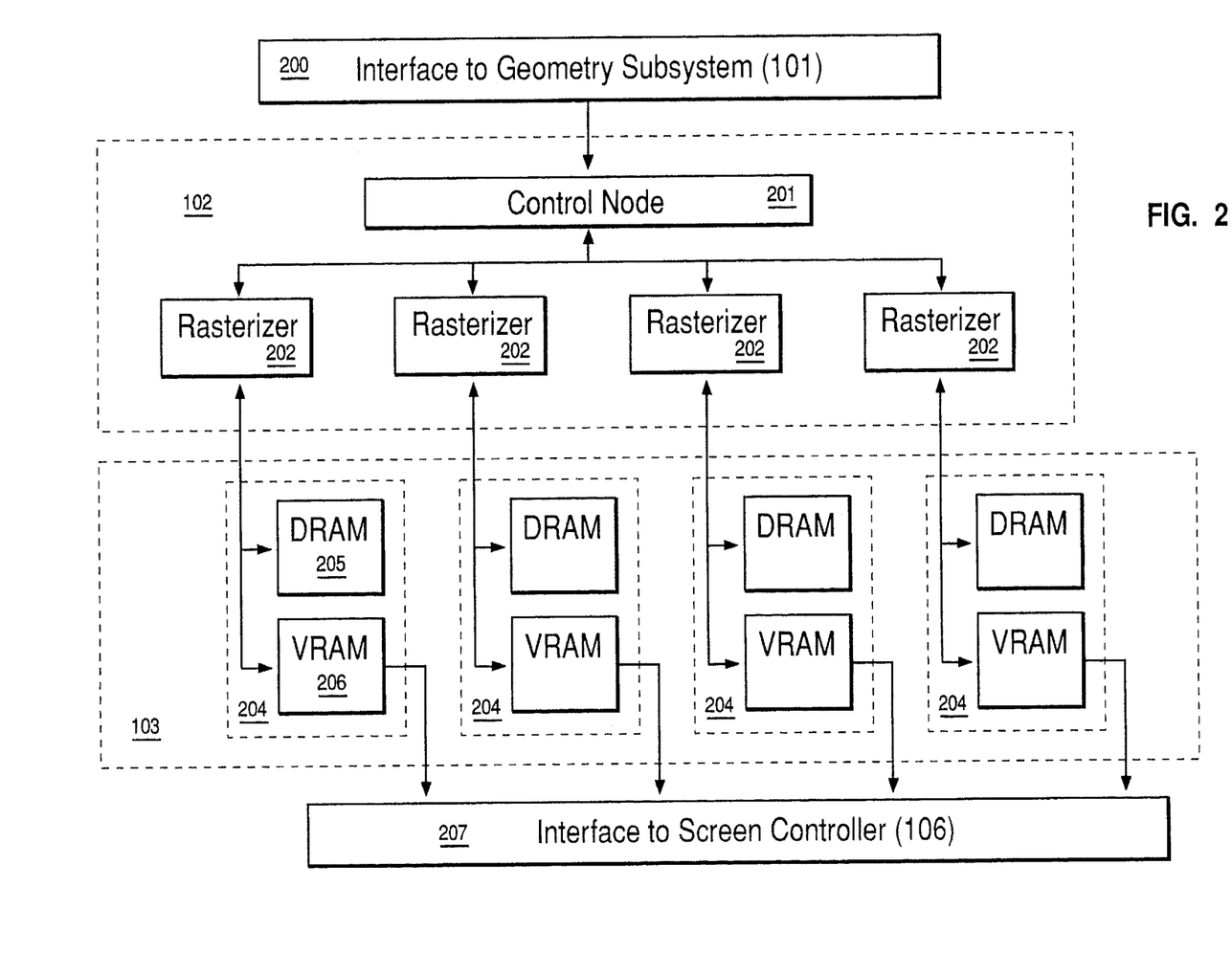
FIG. 2 is a more detailed depiction of the rasterization and frame buffer subsystems of FIG. 1.

A more detailed embodiment of the rasterization subsystem 102 is shown in FIG. 2. This embodiment comprises a multi-rasterizer system, however a single-rasterizer system is equally encompassed in the scope of the preferred embodiment. Similarly, the plurality of rasterizers depicted may be any number, not necessarily four. Data from geometry processor subsystem 101 arrives via interface 200 to control node 201, which is responsible for disseminating and distributing information to each of rasterizers 202. In this embodiment, each rasterizer 202 is associated with a well-defined section of the screen. In particular, the embodiment described assumes that each of the four depicted rasterizers 202 controls every fourth vertical column of pixels in the displayable screen space. For example, the left-most rasterizer 202 controls pixels whose coordinate is 0, 4, 8, etc. Because of the well-defined mapping of the rasterizers 202 to screen coordinates, each rasterizer is attached to one portion (a quarter, in this instance) of the frame buffer 103.

Each frame buffer portion 204 constitutes the memory requires to maintain the pixel data for one rasterizer 202. As mentioned previously, frame buffer 103 constitutes DRAMs 205 and VRAMs 206. (VRAM 104 comprises the plurality of VRAM 206 and similarly, DRAM 105 comprises the plurality of DRAM 205.) VRAMs 206 are shown also being connected to the screen controller interface 207. This connection is made via the VRAMs' serial port, as is well known in the art. Although horizontal interleaving of the frame buffer is indicated above, other choices of frame buffer partitions are possible within the scope of the present invention.

Figure 3:
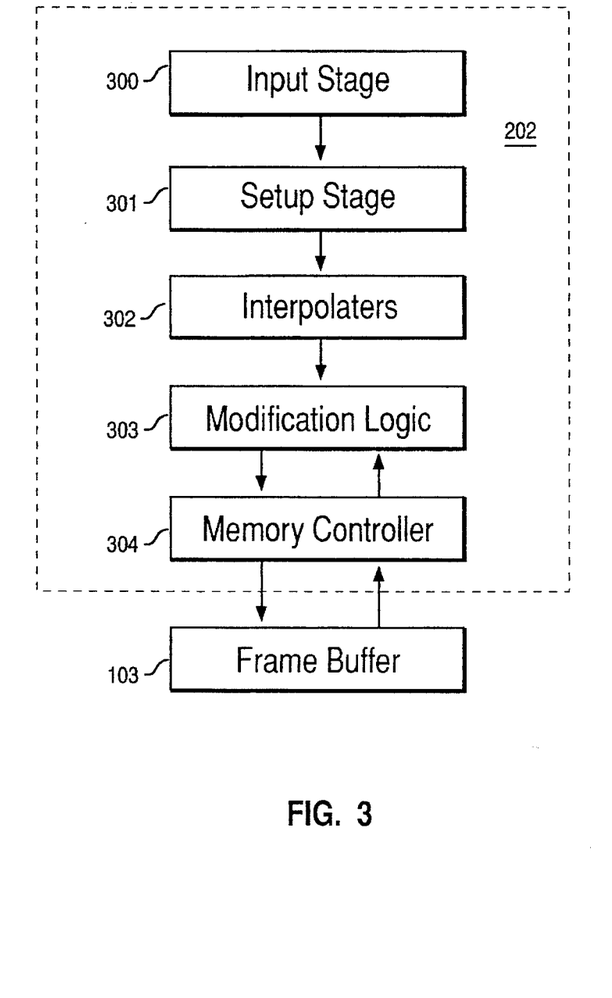
FIG. 3 is a still more detailed depiction of the rasterizer. The preferred embodiment of the current invention is within the rasterizer.

FIG. 3 illustrates one embodiment of rasterizer 202. Data is received by input stage 300. Once vertex information for a given primitive (point, line, or polygon) is received, setup stage 301 generates the parameters necessary for interpolators 302 to generate the intermediate values. In one embodiment the interpolators 302 use the modified Bresenham procedure detailed in Gonzalez-Lopez et al. U.S. Pat. No. 4,805,116, and setup logic in setup stage 301 generates the deltas and error terms described therein. Interpolators 302 generate individual pixels consisting of (X, Y, Z) position, color, transparency, etc. Modification logic 303 performs operations necessary to merge the pixels generated by interpolators 302 with the data currently in frame buffer 103. Modifications may take various forms. The merge operation may be a simple pixel-replace operation where the new pixel value overwrites the current pixel value in the frame buffer. Other merge operations functions include hidden surface removal where the Z value of the new pixel is compared with the current frame buffer value, and the new pixel is not rendered if it lies behind the pixel currently in the frame buffer. Still other merge operations are possible, including operations that affect the blending of the new color value and the old color value of a pixel. Alpha blending is an operation known in the art that combines a new and an old color value of a pixel using an equation generally written as:

$$Color:=Alpha*New\_color+(1-Alpha)*Old\_color$$

Figure 7:
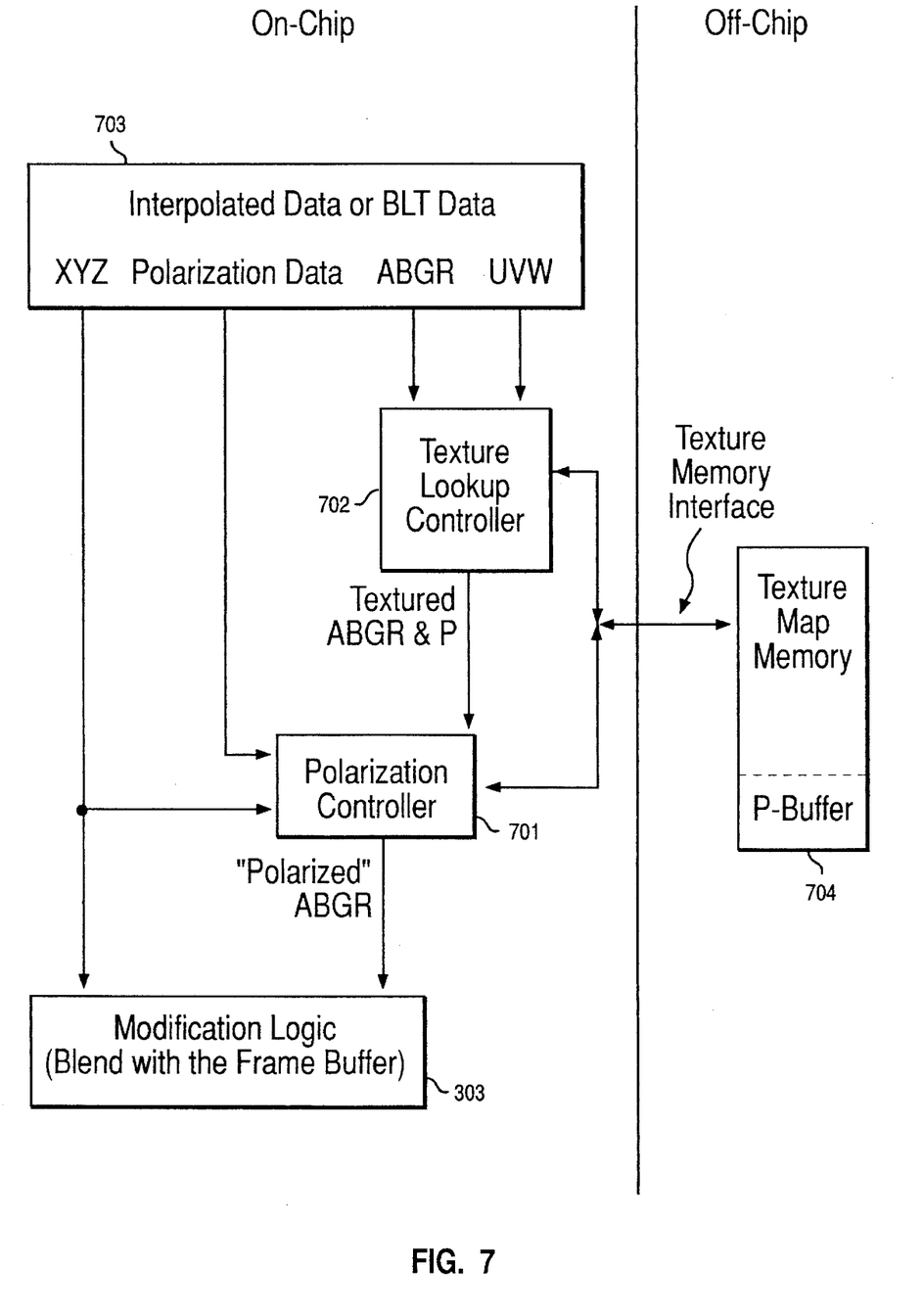
FIG. 7 shows the preferred embodiment of the P-buffer and its associated control logic within a graphics system.

In the preferred embodiment, the control portion of the current invention resides in modification logic 303 embodied as the addition of new control logic (to be detailed in FIG. 7.)

Pixel data is passed between modification logic 303 and frame buffer 103 by memory controller 304. The memory controller is responsive to data from interpolators 302 that specify which pixels are touched by the current rendering primitive and to other commands passed from the geometry processing subsystem 101 (FIG. 1) that specify which frame buffer resources must be read and written.

Before further detailing the current invention, a brief discussion of polarization is given.

Polarization, and more generally, the coherency state of light, is a complicated subject. However, an approximate handling of the polarization state in a rendering operation can lead to considerably more-realistic images than is otherwise possible in an interactive environment. Because of the inherent complexity of the phenomena, the current invention seeks to model coherency in a somewhat simplified manner, thereby making it amenable to a hardware implementation.

Figure 4:
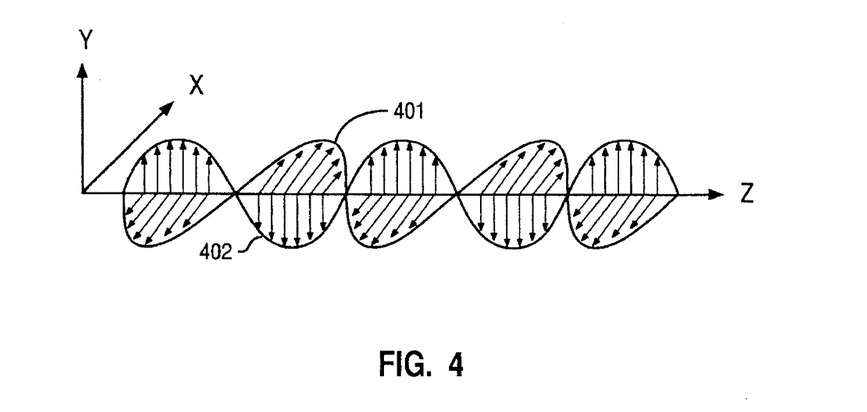
FIG. 4 shows the two mutually perpendicular electric field vector components of an idealized wave train.

When a beam of light is broken into its constituent frequencies, e.g., via Fourier analysis, the polarization state for each of the quasi-monochromatic waves can be represented by a 2×2 complex matrix in which the trace (i.e., the sum of the main diagonal) of the matrix represents the intensity of the particular wavelength and the two complex off-diagonal terms represent the correlation between the two mutually orthogonal electric field vectors 401 and 402 of the wave shown in FIG. 4. See chapter 10 of Born and Wolf (Born, Max and Wolf, Emil, *Principles of Optics,* Sixth Ed., Pergamon Press, 1981.)

Each time a light wave interacts with a medium, either as a reflection, or as transmission, its polarization state may be altered. The alteration of the polarization state can be approximated by, and assigned to, a modification matrix (also a 2×2 complex matrix). See Parrent and Roman (Parrent, G. B. Jr., and P. Roman, "On the matrix formulation of the theory of partial polarization in terms of observables", *Il Nuovo Cimento,* (English version), Vol 15, No. 3, pp. 370–388, February 1960.) Each material in a scene therefore can have associated with it as part of its attributes a polarization modification matrix to be applied during specular transmission. We introduce a novel use for a frame buffer resource (herein termed P-buffer) as the storage means of polarization state information. An approximate representation of the polarization modification matrix is applied to the values maintained in the P-buffer. The values in the P-buffer, in turn, are approximations of the polarization matrix.

The polarization due to initial reflection is computed by a general purpose processor and saved in the P-buffer during the rendering of an opaque medium. Also, for non-opaque media a modification matrix for specular transmission is also provided.

The polarization state for each of the light sources is supplied as input. This information should always be known for a given environment. Typically if a light source represents the sun or is from a standard incandescent or fluorescent source then it can be considered natural (totally incoherent—or non-polarized) light. Such a natural light source is assigned a degree of polarization of zero.

As with alpha blending, the objects must be rendered in depth order from back to front. Each time a more proximal object is encountered, the coherency state (and the polarization) is modified by the closer object's coherency modification matrix. This is accomplished via approximating the complex matrix operation as follows:

$$J_{new}=M*JM$$

Where J and $J_{new}$ are the original and transformed polarization states, respectively, and M is the polarization modification matrix. The asterisk, (*) represents the associate matrix—the complex conjugate of the transpose matrix. Born and Wolf, supra, describe in detail the derivation of the coherency matrix for a quasi-monochromatic light wave and discuss some of its properties. Parrent and Roman, supra, discuss various values of M corresponding to various polarization phenomena. The matrix operation above is too computationally intensive for an exact hardware implementation in a real-time system. Instead, the operation is approximated, thereby permitting real-time operation with only modest hardware requirements.

Referring now to FIG. 4, there is shown the two components of the electromagnetic field of a wave train. The two components are mutually orthogonal and are assigned to exist in the X dimension, component 401, and Y dimension, component 402. The wave train travels along the Z axis. This assignment is for convenience and consistency with the optics literature.

Figure 5:
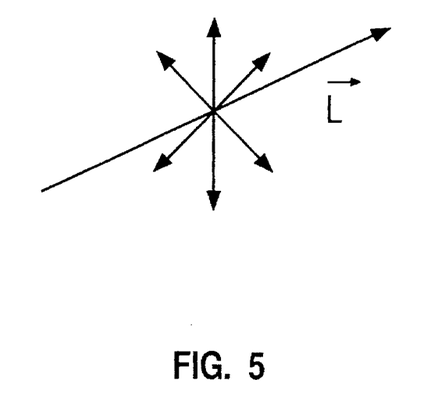
FIG. 5 shows an incoherent light wave train labeled $\vec{L}$.

FIG. 5 depicts the random polarization state associate with a natural light source or one emitted by a heated element such as an incandescent light filament. Light in which the polarization state varies randomly is termed incoherent light. The present invention assigns to each pixel a given coherency. Pixels representing coherent light may in turn have a given polarization state associated with them. Note, the polarization state of incoherent light is not defined, which, in the preferred embodiment, is indicated by the degree of polarization being zero.

Figure 6:
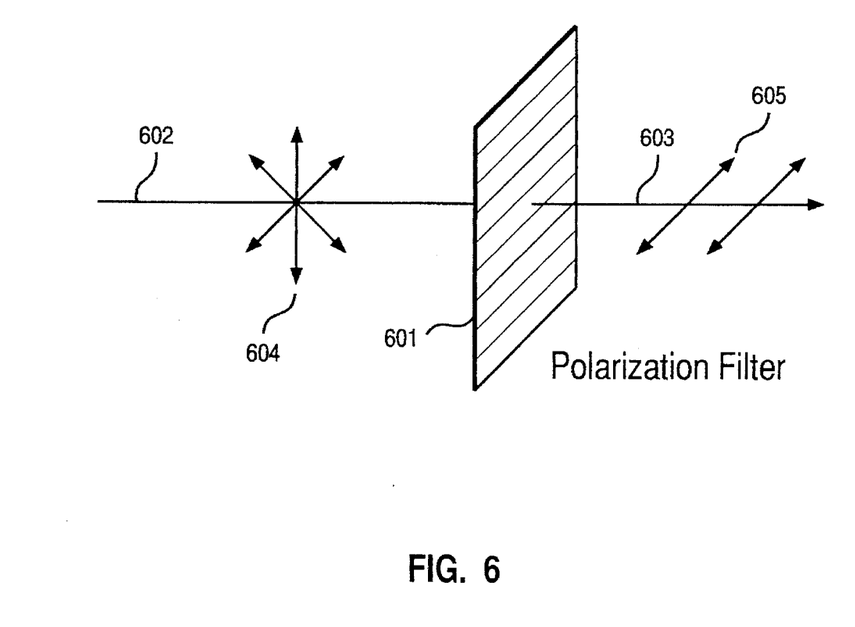
FIG. 6 shows the effect of a polarization filter on an initial partially-coherent wave train.

FIG. 6 shows graphically how the polarization state of an incident wave train 602 becomes more polarized after passing through a polarization filter 601. The initially random electric field vectors 604 are selectively attenuated upon passing through filter 601 and near planar polarization is achieved. The electric field vector of the transmitted wave train 603 is shown graphically by the arrows 605.

As part of the solution to better account for polarization state we introduce the concept of a polarization-buffer or P-buffer. The P-buffer is conceptually similar to a Z-buffer in that it is an array of memory with a one-to-one correspondence with pixel locations. The bits in each location of the P-buffer are used to maintain a polarization state.

In FIG. 7 a graphics system is shown in which a P-buffer is added. In this configuration, the P-buffer is configured as an extension of the texture map memory. Such a configuration has the advantage of allowing the present invention to be implemented with a minimum of additional logic. Here the P-buffer memory is accessed is much the same fashion as texture memory. Furthermore, such a configuration makes combining polarization data with texture data straightforward. The polarization controller uses texture mapped alpha/BGR data and polarization state/polarization modification data as input and produces new alpha/BGR/polarization data.

Figure 8:
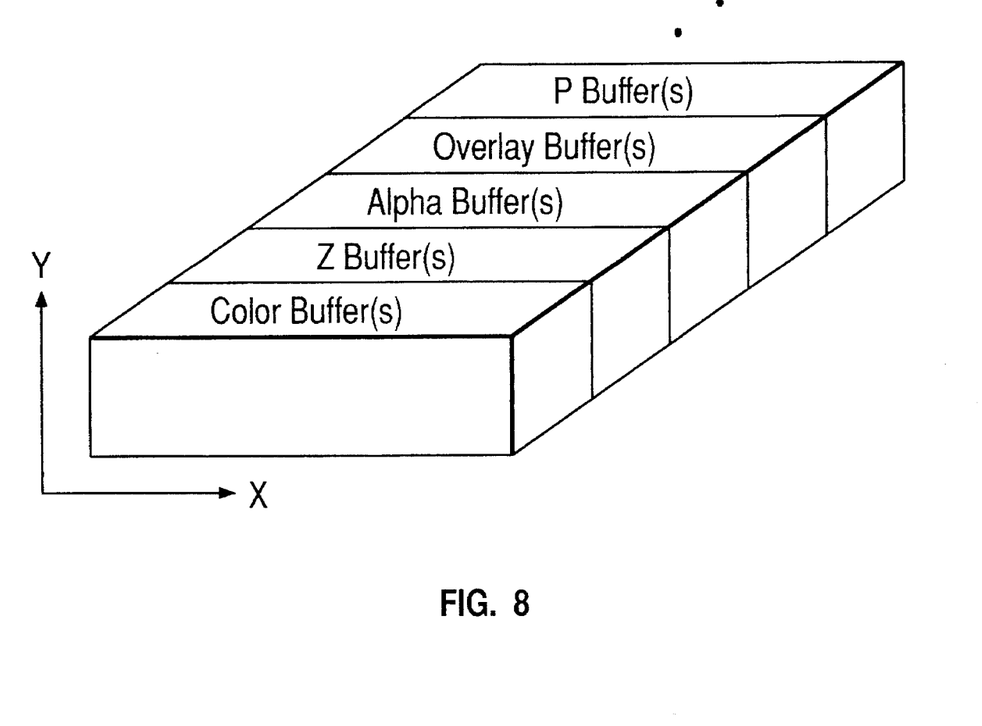
FIG. 8 illustrates details of the preferred embodiment the position and architecture of the P-buffer.

FIG. 8 shows an alternate installation of a P-buffer in a system. This solution is appropriate for systems in which there is no texture map facility separate from the normal scanned frame-buffers. Also, on low end machines, the P-buffer can be placed in a general purpose buffer shared with other algorithms.

For either configuration, the P-buffer can be of varying depths, 8, 16, etc. and is chosen based on current technology and the desired price/performance point. The P-buffer is broken up into several fields used to approximate the current polarization state at each pixel.

Figure 9:
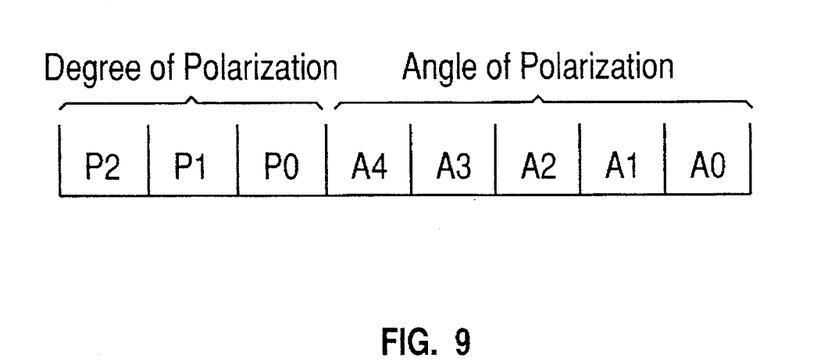
FIG. 9 shows in detail one pixel location in the P-buffer.

FIG. 9 depicts the usage of the bits in the P-buffer as dictated by the preferred embodiment. In the preferred embodiment, three bits are used to represent the polarization state and five bits represent the angle of polarization. For a completely unpolarized source (i.e., incoherent) the angle of polarization is not used. Different numbers of bits can be used to represent these two fields. We choose the ⅗ split because it fits within a standard 8-bit buffer and provides adequate precision.

Figure 10:
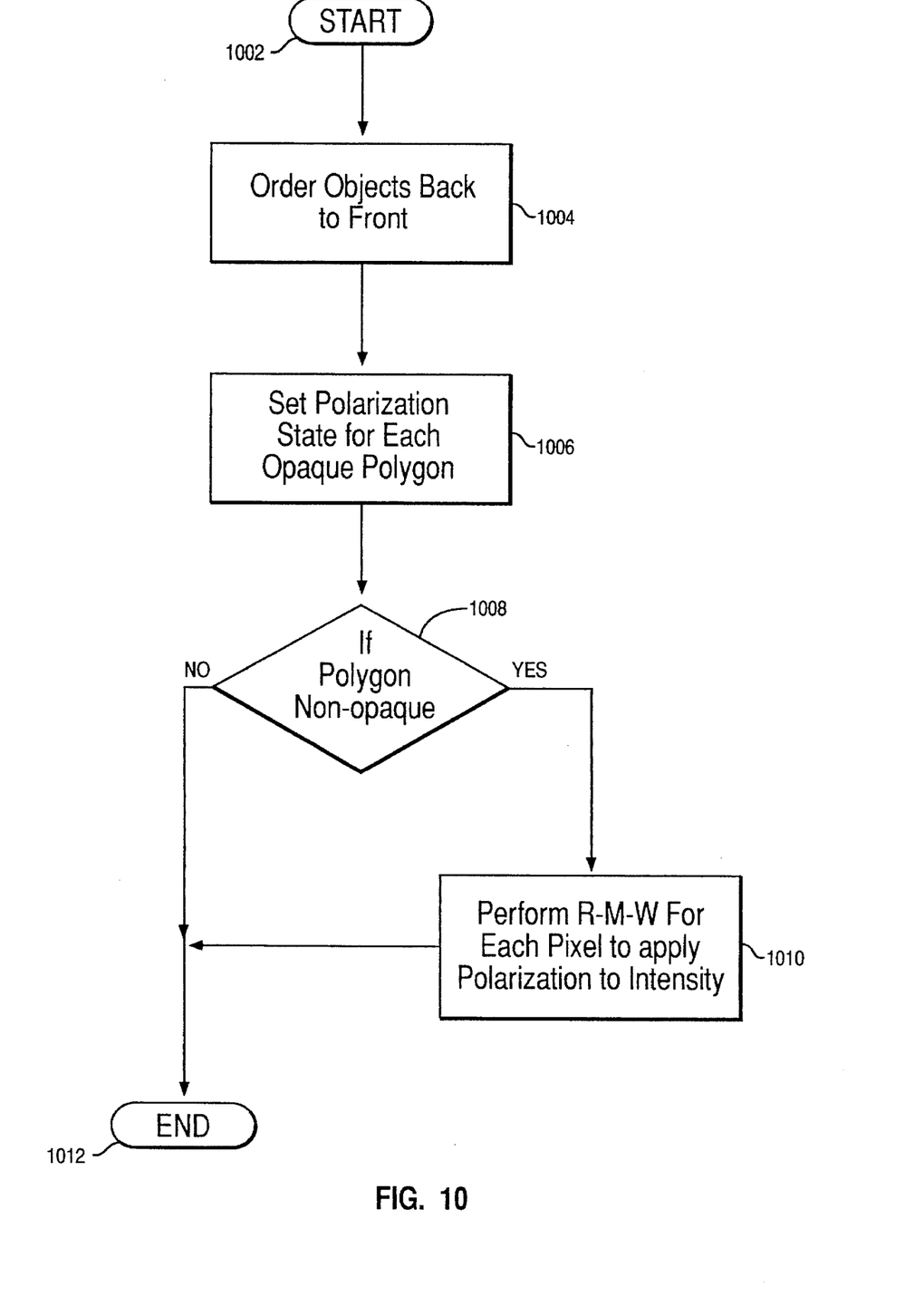
FIG. 10 is a flowchart depicting the process steps of the preferred embodiment of the present invention.

The steps involved in rendering with polarization are illustrated in FIG. 10 and include, 1. Ordering the objects 1004 to ensure that objects are rendered from back to front. This is a common requirement for transparency algorithms such as those using alpha blending and can accomplished by any convenient method known in the art.

2. For each opaque polygon in the scene, sending down 1006 its polarization state to a set of registers in the rasterizer e.g., in polarization controller 701. The initial polarization state associated with a polygon depends on the polarization state of the illuminants, the physical characteristics of the polygonalized surface and the angle of incidence to the light source. The initial polarization state is computed by a general purpose processor and is provided to the rasterizer system.

3. For each non-opaque polygon in the scene (test 1008), performing a read-modify-write operation for each pixel in the polygon 1010. The operation applied to the pixel intensity is based on the current intensity and polarization state of the light at the pixel being updated and the characteristics of the non-opaque polygon.

The per-pixel operation consists of updating three values. The subscripts "in", "filter", and "new" refer to the current values for the pixel, the non-opaque occluding polygon's polarizing characteristics, and the new values for the pixel, respectively.

$$I_{new} = \left(\frac{^oP_{in}}{2^n - 1}\right)[I_{in}\cos(\theta_{in} - \theta_{filter})] + \left(\frac{1 - ^oP_{in}}{2^n - 1}\right)\frac{1}{2} I_{in}$$

$$^oP_{new} = \min[2^n - 1, ^oP_{filter} + ^oP_{in}]$$
$$\theta_{new} = ^oP_{filter} + (1 - ^oP_{filter})\theta_{in}$$

Where,

I is the relative intensity of the pixel. (This equation is applied three times per pixel, once each for the red, green, and blue color components.)

$^oP$ is the degree of polarization for the light at the current pixel $\theta$ is the angle with respect to the reference coordinate axis of the polarization axis n number of bits used to represent the degree of polarization.

Notice that these are all simple equations to implement directly in hardware and thereby make this an easy addition to a rasterization system. The cosine operation used in computing the new intensity value $I_{new}$ can be implemented in a small lookup table. In the preferred embodiment, $\theta$ is represented using 5-bits. The table needed is thus 32-bytes.

In order to ensure that the polarization state and polarization modification characteristics are with respect to the same reference coordinate space, in the preferred embodiment, all polarization characteristics are specified such that the XY-plane is parallel to the screen. By convention, we take the +Z-axis as coming out of the screen towards the viewer.

Only three authors have considered the use polarization in the rendering process: Wolff and Kurlander ("Ray Tracing with Polarization Parameters" *Computer graphics and Applications,* pp. 44–55, November, 1990); and David C. Tannenbaum (*The rendering of anisotropic non-opaque media,* PhD thesis, Rensselaer Polytechnic Institute, Troy, N.Y., Dec, 1993.) Wolff and Kurlander discuss polarization from a software standpoint. Tannenbaum discusses the polarization matrix in relation to the rendering of uniaxial crystals and other media whose characteristics are strong functions of polarization state.

The current invention works with the existing algorithms used for transparency. As a scene is rendered and alpha blending is applied, the current invention acts to modulate the alpha based on the polarization state. The color and attenuation properties of the non-opaque media are factored into the ultimate color generated.

Additionally, the current invention works well with texture mapping. The texture memory can now be used to supply both color intensity information (standard texture mapping) or polarization modification characteristics for a surface. The polarizing characteristics of a material need not be constant over a surface. Using texture mapping permits these characteristics to be interpolated and perspective corrected in the same fashion as a standard texture.

It will be understood from the foregoing description that various modifications and changes may be made in the preferred embodiment of the present invention without departing from its true spirit. It is intended that this description is for purpose of illustration only and should not be construed in a limiting sense. The scope of this invention should be limited only by the language of the following claims.

What is claimed is:

1. A Computer system for displaying two dimensional representation of three dimensional objects in response to a plurality of graphics drawing orders, said graphics drawing orders including object attributes, said computer system including processor means, the system comprising:

first memory means for storing pixel data including a light intensity value for each of a plurality of pixels, said pixel data being generated by said processor means in response to said graphics drawing orders;

second memory means for storing a polarization value representing relative light polarization to be applied to the light intensity value, said memory means storing a polarization value including a polarization angle and a polarization degree determined on a pixel by pixel basis, for each of said plurality of pixels;

processor means for modifying said light intensity value of one or more of said plurality of pixels in said first memory means using a read-modify-write pixel operation based on said light intensity value and said polarization value for each pixel and for modifying said polarization value of said one or more pixels iteratively in response to a second and subsequent graphics drawing order and a display device for displaying said plurality of pixels.

2. The system of claim 1, wherein the polarization value includes a degree of polarization quantity and an angle value with respect to a reference coordinate axis of a polarization axis, and wherein said processor means comprises program logic means for applying the following pixel operations to each of said plurality of pixels:

$$I_{new} = \left( \frac{^oP_{in}}{2^n - 1} \right) [I_{in} \cos(\theta_{in} - \theta_{filter})] + \left( \frac{1 - ^oP_{in}}{2^n - 1} \right) \frac{1}{2} I_{in}$$

$$^oP_{new} = \min[2^n - 1, ^oP_{filter} + ^oP_{in}]$$

$$\theta_{new} = ^oP_{filter} + (1 - ^oP_{filter})\theta_{in}$$

Where,

I is the light intensity of said pixel stored in said first memory means, $^oP$ is the degree of polarization for the light at said current pixel, $\Theta$ is the angle with respect to the reference coordinate axis of a polarization axis, n is a number of bits used to represent the degree of polarization, and where the subscript in represents a current pixel value before processing the second and subsequent graphics orders, subscript filter represents a polarization characteristic of an object generated by the second and subsequent drawing orders, and the subscript new represents a new pixel value determined by said processor means.

3. The system of claim 2, wherein the cosine function (COS) value is determined by accessing a table stored in a storage means.

4. A computer implemented method for displaying objects in a computer graphics system on a display device, said objects being specified by a plurality of graphics drawing orders, said graphics drawing orders specifying properties of opaque and non-opaque objects, the method comprising the steps of:

rendering said objects starting with objects farthest from a viewpoint;

updating a first memory means in response to said rendering step, said first memory means containing a pixel light intensity value for each pixel of said object being rendered;

determining an initial polarization state representing relative light polarization to be applied to the light intensity value for each of said pixels;

storing said initial polarization state in a second memory means by performing the following steps on a pixel by pixel basis:

determining a degree of polarization of said graphic object;

determining an angle of polarization of said graphic object;

storing said degree of polarization and said angle of polarization in said second memory means on a pixel by pixel basis such that said polarization state is associated with the corresponding intensity value;

testing each of said graphic object properties after the a first graphic object to determine whether or not it is an opaque object;

updating said intensity value and said polarization state by applying a read-modify-write pixel operation on a pixel by pixel basis, to the intensity and polarization state based upon the intensity value of said pixel and said polarization state, if said graphic object is not opaque; and displaying the final rendered objects on said display device.

5. The method of claim 4, wherein the step of updating the intensity value and the polarization state comprises the steps of:

applying a pixel operation to modify a current intensity for each pixel ($I_{in}$) based on a current polarization value $^oP_{in}$ and a current and applied polarization angle ($\Theta_{in}$ and $\Theta_{filter}$, respectively) according to:

$$I_{new} = \left( \frac{^oP_{in}}{2^n - 1} \right) [I_{in} \cos(\theta_{in} - \theta_{filter})] + \left( \frac{1 - ^oP_{in}}{2^n - 1} \right) \frac{1}{2} I_{in}$$

applying a pixel operation to establish a new polarization value $^oP_{new}$ based on the current and applied polarization values ($^oP_{in}$, $^oP_{filter}$) according to:

$$^oP_{new} = \min|2^n - 1, ^oP_{filter} + ^oP_{in}|$$

applying a pixel operation to establish a new polarization angle $\Theta_{new}$ based on the current polarization angle ($\Theta_{in}$) and applied polarization value ($^oP_{filter}$) according to:

$$\theta_{new} = {}^\circ P_{filter} + (1 - {}^\circ P_{filter})\theta_{in}$$

where,

I is the intensity of said pixel stored in said first memory means,

°P is the degree of polarization for the light at said current pixel,

Θ is the angle with respect to the reference coordinate axis of the polarization axis, n is a number of bits used to represent the degree of polarization.

6. The method of claim 5, wherein the cosine function (COS) value is determined by accessing a table stored in a storage means.

* * * * *